United States Patent [19]

Stadnik et al.

[11] Patent Number: 5,013,951
[45] Date of Patent: May 7, 1991

[54] MULTIPOLAR ROTOR FOR ELECTRIC MACHINE WITH INTERPOLAR AND POLAR MAGNETS

[76] Inventors: Ivan P. Stadnik, ulitsa Kievskaya, 134-A, kv. 18; Nikolai I. Klevets, ulitsa Z. Kosmodemyanskoi, 16, both of Simferopol; Alexandr I. Gridnev, ulitsa Gorkogo, 85-B, kv. 31, Vladimir; Nikolai A. Kelin, ulitsa Frunze, 34, kv. 54, Vladimir; Anatoly F. Sitnikov, ulitsa Rastopchina, 59-B, kv. 31, Vladimir, all of U.S.S.R.

[21] Appl. No.: 477,816
[22] PCT Filed: Aug. 19, 1988
[86] PCT No.: PCT/SU88/00159
§ 371 Date: Apr. 19, 1990
§ 102(e) Date: Apr. 19, 1990
[87] PCT Pub. No.: WO90/02434
PCT Pub. Date: Mar. 8, 1990
[51] Int. Cl.[5] .................... H02K 21/08; H02K 21/14
[52] U.S. Cl. .................................. 310/156; 310/186
[58] Field of Search .................... 310/156, 261, 186

[56] References Cited
U.S. PATENT DOCUMENTS 3,334,254  8/1967  Kober ................................. 310/156
4,127,786  11/1978 Volkrodt .
4,358,696  11/1982 Liu et al. .
4,543,506  9/1985  Kawada et al. ................... 310/156
4,645,961  2/1987  Malsky .............................. 310/156

FOREIGN PATENT DOCUMENTS 647797    2/1979  U.S.S.R. .
2075274  11/1981  United Kingdom .

OTHER PUBLICATIONS

"Elektricheskie generatory s postoyannymi magnitami", by Balagurov et al., 1988, Energoatomizdat, pp. 28-29.

Primary Examiner—Steven L. Stephan
Assistant Examiner—D. Rebsch
Attorney, Agent, or Firm—Fleit, Jacobson, Cohn, Price, Holman & Stern

[57] ABSTRACT

A multipolar rotor of an electric machine, essentially in the form of a circular cylinder, comprising an even number of pole magnets (1), which is equal to at least four, said pole magnets (1) being arranged uniformly along a circle and interpole magnets (2) adjacent thereto. The pole magnets (2) form, in combination, a cylindrical surface of the rotor. The pole magnets (1) are magnetized parallel to their planes (5) of symmetry, while the interpole magnets (2) are magnetized normal to their planes (6) of symmetry.

6 Claims, 3 Drawing Sheets

MULTIPOLAR ROTOR FOR ELECTRIC MACHINE WITH INTERPOLAR AND POLAR MAGNETS

TECHNICAL FIELD

This invention relates to electric machines and, more specifically, to a multipolar rotor of an electric machine.

BACKGROUND ART

High specific electromechanical characteristics (power output, torque, electromotive force per unit mass of the machine) are very important for electric machines having permanent magnets.

This objective can be attained by increasing the intensity of the magnetic flux produced by the multipolar rotor of an electric machine by making the rotor magnets from anisotropic magnetically hard materials having high magnetic characteristics, better utilization of the rotor volume for disposing the magnets and optimum orientation of their lines of force.

Known in the art is a multipolar cylindrical rotor of an electric machine, comprising prism-shaped permanent magnets disposed uniformly around a circle and magnetized along their axes of symmetry, each magnet being provided with a pole piece made of magnetically soft material. For complete filling of the rotor volume with magnetically hard material, prismatic magnets have tapered side faces by which the adjacent magnets join one another.

The permanent magnets are secured on a bushing made of a magnetically soft material; arranged between these permanent magnets are inserts of a nonmagnetic material.

The above rotor does not allow its volume to be completely filled with magnetically hard material, which is spaced from the rotor surface due to the presence of pole pieces, and this does not allow the magnetic flux to be increased significantly. In addition, the presence of pole pieces reduces the magnetic flux due to appearance of a leakage flux between the adjacent pole pieces, which increases eddy-current and remagnetization losses and also increases the electric machine inductance.

The magnetic flux of such a magnet is produced by the magnetic charges distributed over the poles, which are arc-shaped in cross section; the length of this arc is much lower than the pole division of the rotor, as well as the magnetic charges distributed on the surface of the magnetically soft bushing and producing a magnetic flux of the opposite direction with respect to the magnetic flux of the charges distributed over the poles. These two factors: a shortened pole arc and the presence of an oppositely directed magnetic flux in the magnetically soft bushing reduce the magnetic flux per pole. Furthermore, the shortened arc results in quick drop of induction in the gap beyond this arc, reducing the mechanical torque produced by the motor.

Known in the art is a cylindrical rotor with permanent magnets for electric machines, comprising pole sections made of a magnetically soft material disposed uniformly along a circle, and interpole sections made of a magnetically hard material magnetized normal to the respective planes of symmetry of the adjacent pole sections.

The concentration of the magnetic flux in the gap between the above described rotor and stator of the electric machine is obtained due to the presence of sections of magnetically soft materials in this gap.

The above rotor of an electric machine, having definite number of poles and small working gaps, increases the magnetic flux but, at the same time, increases the leakage flux due to the presence of sections of magnetically soft material, as well as the inductance of the electric machine with such a rotor thus hindering the electric drive control.

Also known in the art is a rotor of an electric machine, made in the form of a circular cylinder and comprising an even number of pole magnets (at least four magnets) disposed uniformly around a circle; some poles of these magnets face the center of the circle while the other poles face its periphery and alternate; the interpole magnets adjoining the pole magnets have side surfaces turned to the circle periphery.

The pole magnets are equipped with pole pieces made of a magnetically soft material, which in combination with the interpole magnets form a cylindrical surface of the rotor. The pole magnets are secured on a bushing made of a magnetically soft material and are magnetized in the radial direction, while the interpole magnets are mounted with a gap relative to the bushing and are magnetized along the arcs of circles. In this rotor the presence of pole pieces orienting the lines of force of the magnetic field normal to the working surface of the rotor results in that the pole magnets do not face the side surface of the rotor, while the leakage fluxes are not fully eliminated so that the magnetic flux is reduced. Furthermore, the addy-current and remagnetization losses increase, as well as the electric machine inductance.

In this case the radial direction of magnetization of the pole magnets and the arc-shaped direction of magnetization of the interpole magnets are difficult to provide technologically, while attainment of such a direction of magnetization would impair the magnetic characteristics of the magnetically hard materials. If radial magnetization is achieved, magnetic charges appear inside the pole magnets, which reduce the excitation magnetic flux.

The presence of a bushing made of a magnetically soft material does not allow the rotor volume to be used entirely for mounting the magnets, reduces the rotor resistance to demagnetization, causes eddy-current and remagnetization losses and increases the electric machine inductance.

DISCLOSURE OF THE INVENTION

This invention is to provide a multipolar rotor of an electric machine, whose pole and interpole magnets are arranged and magnetized so that the magnetic flux of the rotor could be substantially increased.

Still another object is to reduce the eddy-currents and remagnetization losses.

These objects are attained by providing a multipolar rotor, essentially in the form of a circular cylinder, in which the pole magnets, whose quantity is even and equal to at least four, are disposed uniformly along a circle and magnetized in parallel to their axes of symmetry; adjoining the pole magnets are interpole magnets whose side surfaces are turned to the periphery of the circle and are magnetized normal to their axes of symmetry; some poles of the pole magnets face the center of the circle, while the other poles face the periphery of the circle, alternate and, in combination with the side surface of the interpole magnets, form a cylindrical surface of the rotor.

In order to form a cylindrical surface of the rotor it is expedient that each pole magnetic in the rotor cross section is a part of a circle limited by an arc whose length is substantially equal to the product of the pole overlap factor by a value of pole division of the rotor and the segment of the chords intersecting at the point lying on the plane of symmetry of the corresponding pole magnet; each interpole magnet is a geometric figure having some opposite sides combined with the segments of the chords of the adjacent pole magnets and having other opposite sides symmetrical with respect to the plane of symmetry of the interpole magnet.

It is also expedient that the angle between the segments of the chords of the pole magnet is determined from the relation:

$$\beta = \alpha \left( \frac{p}{3} + \frac{3}{4} \right),$$

where
p is the number of pairs of poles of the rotor;
α is the arc limiting the pole magnet.

The angle between the segments of the chords of the pole magnet is preferably equal to $$\frac{\pi}{p}.$$

To form a cylindrical surface of the rotor, it is preferable that in the rotor cross section each pole magnet is a part of a circle limited by peripheral arc whose length is equal to the pole division of the rotor namely the length of each pole arc is expressed as $\pi/2$ and by the segments of the chords extending from the ends of the arc and resting on the arc $$\left( \frac{\pi}{2} + \frac{\pi}{2p} \right),$$

while each interpole magnet is an isosceles triangle whose side faces are combined with the segments of the chords of the adjacent pole magnets while the apex lies at a point between the ends of the arcs of these pole magnets.

The claimed multipolar rotor of an electric machine produces a magnetic flux close to the maximum possible one for the given magnetically hard material and the rotor volume.

In the claimed rotor, use may be made of magnets of anisotropic magnetically hard materials with a rectilinear crystalline and magnetic texture having high magnetic properties. In addition, the claimed rotor features high resistance to demagnetization since it has no components made of magnetically soft materials.

The use of the claimed rotors in electric machines makes it possible to significantly reduce eddy-current and remagnetization losses, since the anisotropic magnetically hard materials have low conductivity.

The claimed design allows one to create rotors having a large number of poles (20 and more) widely used, for example, in step motors without essential reduction of the total (for all pole pieces) magnetic flux.

BRIEF DESCRIPTION OF ACCOMPANYING DRAWINGS

The invention is further described by way of example with reference to the accompanying drawings, in which.

BEST MODE FOR CARRYING OUT THE INVENTION

The multipolar rotor, essentially in the form of a circular cylinder, comprises an even number of pole magnets 1 (FIG. 1), whose number is equal to at least four, disposed uniformly along a circle with a radius R (in the embodiment described herein there are four pole magnets 1 corresponding to a four-pole rotor), some poles of which face the center of the circle while the other poles face the periphery thereof and alternate. Adjoining the pole magnets 1 are interpole magnets 2 disposed so that their like poles join the side surfaces of the pole magnet 1 located between the magnets 2 and are coincident with that pole of the pole magnet 1 which faces the periphery of the circle.

The pole and interpole magnets 1, 2 are made of similar or different anisotropic magnetically hard materials, preferably of magnetically hard materials with a rectilinear crystalline and magnetic texture, since these materials have high magnetic characteristics.

The pole magnets 1 are disposed so that some of their poles facing the periphery of the circle, together with the side surfaces of the interpole magnets 2, form the cylindrical surface of the rotor.

In the rotor cross section (in this and other figures a view of the rotor end face is shown for convenience) each pole magnet 1 is a part of a circle with a radius R limited by an arc α whose length l is determined by the design of the stator 3 of the electric machine and in this case is essentially equal to the product of the pole overlap factor by the value of the pole division τ.

Figure 1:
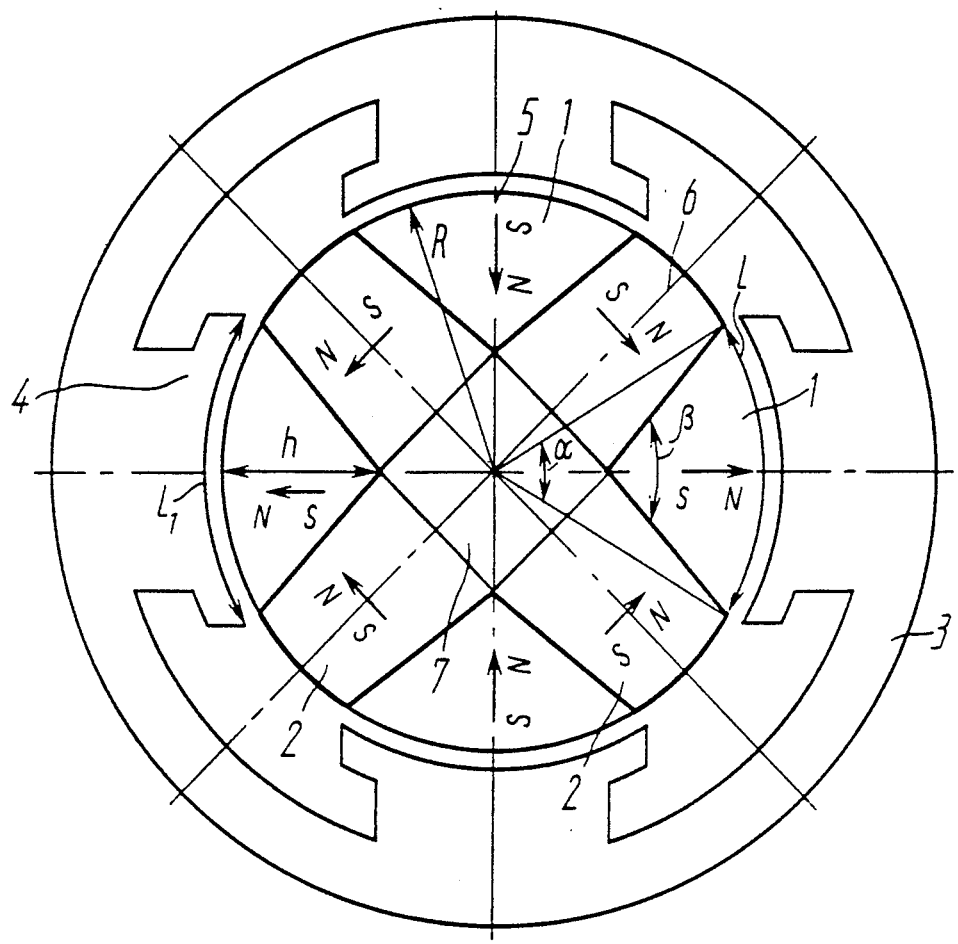
FIG. 1 shows a four-pole rotor of an electric machine, an end-face view according to the invention.

In the embodiment being described FIG. 1 shows a stator 3 of a step electric motor (the winding is not shown) with a small working gap, for which the pole overlap factor is determined as a ratio of the arc length $l_1$ of the pole 4 of the stator 3 to the pole division τ. In this case the length l of the arc of the pole magnet 1 is practically equal to the length $l_1$ of the arc of the pole 4 of the stator 3.

The pole magnet 1 is also limited by two segments of chords extending through the ends of the arc α and intersecting at a point lying in the plane 5 of symmetry of the pole magnet 1.

The angle β between the segments of the chords of each pole magnet 1 is selected so that the magnetic flux $\bar{\phi}$ per of different anisotropic magnetically hard materials, preferably of magnetically hard materials with a rectilinear crystalline and magnetic texture, since these materials have high magnetic characteristics.

The angle $\beta$ between the segments of the chords of each pole magnet 1 is selected so that the magnetic flux $\overline{\phi}$ per pole is close to the maximum flux $\overline{\phi}_{max}$ (the difference must not exceed 5%) with minimum consumption of the magnetically soft material.

In addition, the angle $\beta$ depends on the design of the electric machine in which the rotor will be mounted, that is, on the number of poles, the gap between the rotor and the stator, the width of the rotor pole and the ratio of magnetization of the pole and interpole magnets 1, 2. If the magnetization vectors of all magnets 1, 2 are equal and the gap between the rotor and stator is small (up to 0.05 R), these conditions are met by the formula:

$$\beta = \alpha\left(\frac{p}{3} + \frac{3}{4}\right) \quad (1)$$

where p is the number of pairs of poles of the rotor equal to the number of pairs of pole magnets 1.

For the embodiment being described with p=2 and $\alpha=0.5$, the angle $\beta$ is equal to 0.354 $\pi$ (in radians).

Each interpole magnet 2 in the rotor cross section is a geometric figure in which some opposite sides are combined with the segments of the chords of the pole magnets 1, while the other opposite sides are symmetrical with respect to the plane 6 of symmetry of the interpole magnet 2. In the embodiment being described one side of the interpole magnet 2 facing the center of the circle is a segment of a straight line connecting the apices of the adjacent pole magnets 1, while the opposite side consists of an arc $$\left(\frac{\pi}{p} - \alpha\right)$$

of a circle having a radius R. With such a design of the interpole magnets 2 a square channel 7 is formed in the central part of the rotor. Bushings and a shaft made of non-magnetic material can be disposed in this channel 7.

Figure 2:
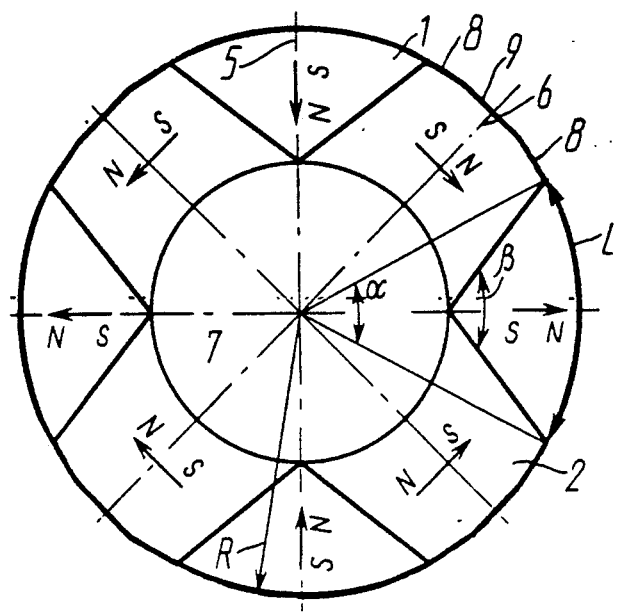
FIG. 2 shows the four-pole rotor having another shape of interpole magnets, an end-face view, according to the invention.

In the other embodiment of the rotor shown in FIG. 2 the pole magnets are made in a similar manner, as described above, while one side of each interpole magnet 2 facing the center of the circle is an arc of a circle with a radius equal to $$\frac{\pi}{p},$$

while the other opposite side is a broken line consisting of two segments 8 of an arc $$\left(\frac{\pi}{p} - \alpha\right)$$

and an arc 9 disposed between these segments normal to the plane 6 of symmetry of the interpole magnet 2. In this case a channel 7 having a circular cross section is formed in the central part of the rotor, and this is technologically advantageous when making a bushing and a shaft to be mounted in the rotor.

Figure 3:
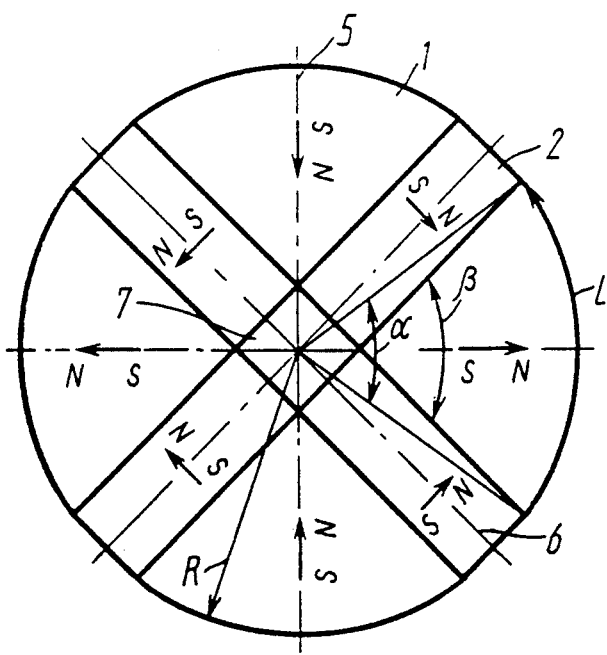
FIG. 3 is the same shown in FIG. 2 with still another shape of pole and interpole magnets, an end-face view, according to the invention.

In the embodiment of the rotor shown in FIG. 3 the pole magnets 1 are also a part of a circle with a radius R having a length l of an arc $\alpha$ determined as described above, by the angle $\beta$ between the segments of the chords limiting the pole magnets 1 found from the relation $$\beta = \frac{\pi}{p}.$$

When such a relation is observed, the segments of the chords of the adjacent pole magnets 1, between which the interpole magnet 2 is located, are parallel. In this case the interpole magnets 2 are preferably made in the form of rectangles to make their manufacturing easier.

Figure 4:
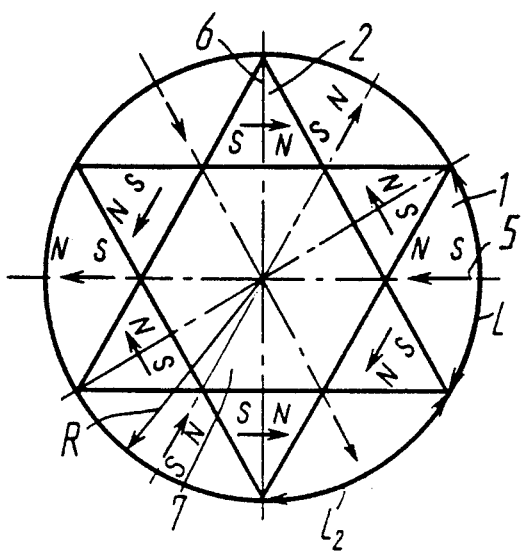
FIG. 4 shows a six-pole rotor having yet another shape of pole and interpole magnets, an end-face view, according to the invention.

In still another embodiment of the multipolar rotor shown in FIG. 4, use is made of a six pole rotor, in which each pole magnet 1 is a part of a circle limited by an arc $\alpha$ whose length l is equal to the pole division $\tau$ and segments of chords extending from the ends of the arc $\alpha$ and resting on an arc whose length $l_2$ is equal to $$\left(\frac{\pi}{p} + \frac{\pi}{2p}\right).$$

Each interpole magnet 2 has a shape of an isosceles triangle whose side faces are combined with the segments of the chords of the pole magnets 1, while the apex lies at the point between the ends of the arcs of these pole magnets 1.

Such making of the pole and interpole magnets 1, 2 makes it possible to save the magnetically hard material, and this regularity is the more pronounced, the higher the number of poles, which is also true for the above-described embodiments of the rotor.

Figure 5:
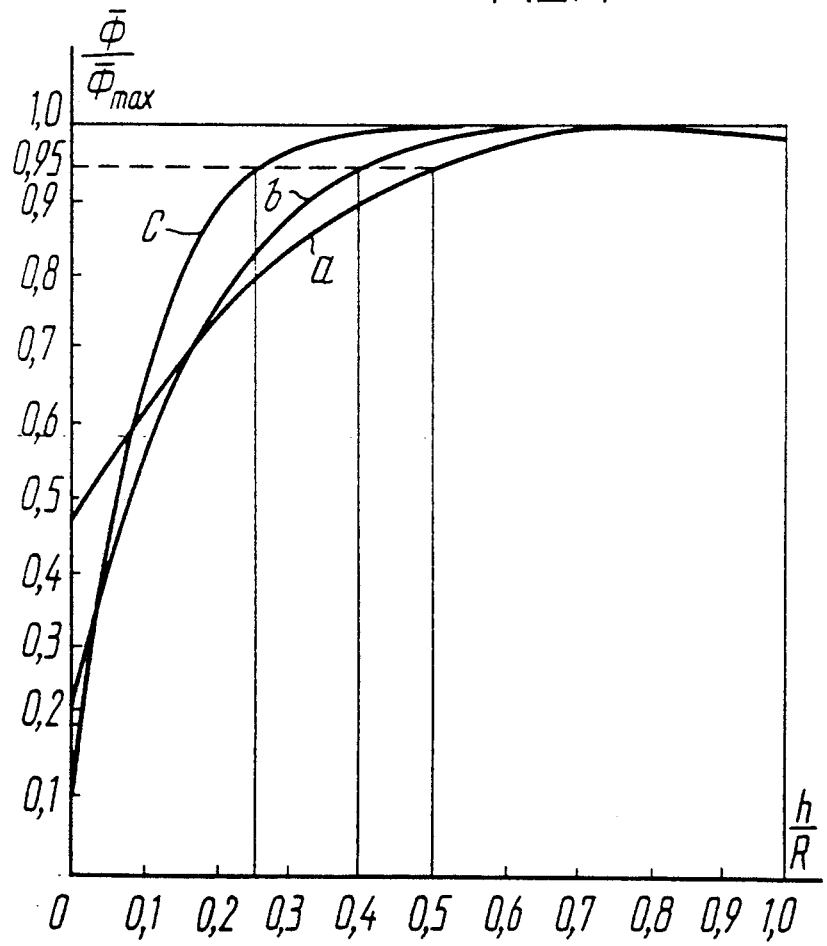
FIG. 5 shows graphs of the magnetic flux (in relative units) on the pole of the rotor shown in FIG. 1, versus the ratio of the thickness of the pole magnets to the rotor radius for a different number of poles.

For better understanding of the essence and advantages of the invention, FIG. 5 shows theoretical graphs of dependence of the ratio of the magnetic flux $\overline{\phi}$ to the maximum possible flux $\overline{\phi}_{max}$ plotted on the ordinate axis for the multipolar rotor shown in FIG. 1 upon the thickness h of the pole magnet 1 measured along its plane 5 of symmetry to the radius R of the rotor for different quantity of poles (a curve a for p=2, a curve b for p=4, a curve c for p=8).

The claimed multipolar rotor of an electric machine is made as follows.

Cut from a magnetically hard material are pole and interpole magnets (FIGS. 1, 2) of the above-described shape and a size determined by the size of the stator, in which the rotor will be mounted.

If an anisotropic magnetically hard material with a straight-line crystalline and magnetic texture is used for making the pole and interpole magnets 1, 2, it is necessary to cut the magnets 1, 2 so that the planes 5 of symmetry of the pole magnets 1 are parallel to the axes of light magnetization of the material, while the planes 6 of symmetry the interpole magnets 1, 2 are normal to the axes of light magnetization.

After that, the cut magnets 1, 2 can be magnetized in a two-pole inductor in a predetermined direction, i.e. the pole magnets 1 are magnetized in parallel to their plane 5 of symmetry, while the interpole magnets 2 are magnetized normal to the plane 6 of symmetry of these magnets 2.

Then the magnets 1, 2 are connected, the pole magnets 1 and interpole magnets 2 being connected in alternation. The magnets 1, 2 are secured by means of an adhesive or an envelope of a nonmagnetic material (not shown). The large-size magnets 1, 2 can be assembled from small pieces. In doing so, the above requirements on the orientation of their axes of light magnetization must be observed. In the process of assembly the interpole magnets 2 may immediately be secured on the bushing or the rotor shaft having a respective cross-sectional area.

If ceramic magnets are used, the interpole magnets 2 may be made using the powder metallurgy technique.

In other cases, the magnetization of the assembled rotor can be effected using a multipolar inductor (corresponding to the number of poles of the rotor); in order to obtain optimum topography of the magnetic field, current-carrying conductors may be placed in the axial channel 7 of the rotor. After the magnetization process has been completed, these conductors are removed.

The presence of the pole and interpole magnets 1, 2 of the above shape in the same pole zone limited by the planes 6 of symmetry of the adjacent interpole magnets 2, with different direction of magnetization and shape of the magnets 1, 2 results in that the excitation magnetic flux is produced by both the magnetic charges distributed over the cylindrical surface of the rotor and the internal magnetic charges appearing at the interface of the pole and interpole magnets 1, 2. In this case the internal magnetic charges in combination with the surface charges produce a magnetic flux close to the maximum possible flux, if the magnetic flux of the rotor is completely filled with magnetically hard material and the magnetization of the rotor at each point is optimally oriented.

The value of the magnetic flux of the field of the internal charges depends on the position of the point of intersection of the interface of the pole and interpole magnets 1, 2 with the plane 5 of symmetry of the pole magnets 1, i.e. is determined by the value of the angle $\beta$ between the segments of the chords of the pole magnets 1.

The optimum angle $\beta$ is such that $\overline{\phi}$ is equal to 0.95. With such a choice of the value of the angle $\beta$, the magnetic flux produced by the rotor will be close to the maximum one $\overline{\phi}_{max}$ with minimum consumption of the magnetically hard material. The graphs shown in FIG. 5 make it possible to determine the angle $\beta$ for the given value of the arc $\alpha$ and the ratio $$\frac{h}{R}.$$

It is clear that as the number of poles increases, the optimum ratio $$\frac{\phi}{\phi_{max}}$$

is obtained with a lower value of the thickness h of the pole magnet 1. As the number of poles of the claimed rotor increases, the magnetic flux $\phi$ per pole decreases slower than in the prior art multipolar rotors. This is due to the fact that, when the number of poles is increased, the interface of the pole and interpole magnets 1, 2, where the internal magnetic charges are concentrated, approaches the surface of the rotor having an optimum design. The calculations have shown that the total magnetic flux (for all 2p poles) of the claimed rotor first increases following the increase of the number of poles (up to 2p=16–20), and then drops down insignificantly.

The value of the magnetic flux of the field of the internal charges depends on the number of poles of the rotor. For example, for a four-pole magnet the magnetic flux of the field of the internal charges with an optimum value of the angle $\beta$ found by the formula (1) and with $\alpha=0.5\tau$ is equal to 26% of the magnetic flux of the surface charges, i.e. the claimed rotor will produce a magnetic flux by 26% higher than, for example, the rotor made of the same material in accordance with Soviet Inventor's Certificate No. 647797.

The contribution of the internal charges to the magnetic field increases with an increase in the number of poles. Thus, for 14-pole rotor with $\alpha=0.5\tau$ and the angle $\beta$ calculated using the formula (1), the magnetic flux of the field of the internal charges is equal to 53% of the magnetic flux of the field of the surface charges, i.e. the magnetic flux increases by 53%.

The rotor shown in FIG. 2 is technologically advantageous, since it may be provided with a shaft having a circular cross section and made of a nonmagnetic material. However, if the interpole magnets 2 have the above-described shape, magnetic charges appear at their internal boundaries because in this case we have a non-zero normal magnetization component which insignificantly reduces the magnetic flux. The regularities found for the above described embodiment of the multipolar rotor relating to the determination of an optimum value of the angle $\beta$, the contribution of the internal charges the magnetic flux with an increase of the number of poles, and other regularities are also typical for the embodiment being described.

The interpole magnets 2 (FIG. 3) in the form of rectangles are most simple in manufacture; however, the magnetic flux $\overline{\phi}$ of the rotor with such magnets 2 drops down insignificantly compared to $\overline{\phi}_{max}$.

In the rotor embodiment shown in FIG. 4 each pole magnet 1 is limited by an arc $\alpha$ whose length is equal to the pole division $\tau$ of the rotor, while the angle between the segments of the chords is selected provided that no magnetic charges are present at the interface between the pole magnets 1 and the interpole magnets 2. In this case the magnetic flux $\overline{\phi}$ will be produced solely by surface charges. This flux will be somewhat lower than $\phi_{max}$, however, the internal part of the rotor is not filled with magnetically hard material, i.e. the rotor weight is reduced considerably.

All embodiments of the invention described above are characterized by the absence of components made of a magnetically soft material, and this makes it possible to increase the resistance of the rotor to demagnetization and to reduce the eddy-current and remagnetization losses.

The advantages of the claimed invention are illustrated by comparative characteristics for various types of electric motor the magnets were made of a magnetically hard material having similar properties).

| Motor type | Number of poles | Motor weight, kg | Mechanical torque, N m | Specific torque N m/kg |
|---|---|---|---|---|
| motor with claimed rotor | 8 | 11.2 | 13 | 1.15 |
| "Siemens" IPFT5 motor | 6 | 13.5 | 12 | 0.88 |
| motor with | 6 | 65 | 40 | 0.61 |

-continued

| Motor type | Number of poles | Motor weight, kg | Mechanical torque, N m | Specific torque N m/kg |
| --- | --- | --- | --- | --- |
| claimed rotor | | | | |
| "Bosch" motor | 6 | 67 | 25 | 0.37 |

As seen from the table, the electric motor with the claimed rotor has better parameters compared to the best prior art devices.

Thus, the claimed multipolar rotor makes it possible to produce a magnetic flux close to the maximum one, and this significantly improves the electromechanical parameters of the electric motor, in which it is mounted.

Industrial Applicability

This invention can be used in electrical industry, aircraft and machine-building industries and other fields for making permanent-magnet rotors for electric machines, electromagnetic couplings, reduction gears, and brakes.

We claim:

1. A multipole rotor for an electric machine, substantially in the form of a circular cylinder comprising:
a group of pole magnets whose number is even and equal to at least four, which are disposed uniformly around a circle with a center and a periphery, the pole magnets having pole faces facing the center of the circle and other pole faces facing the periphery of the circle, each pole magnet having a substantially radial plane of symmetry, each pole magnet being magnetized parallel to the plane of symmetry and forming in cross-section a part of a circle enclosed by a peripheral arc of the circle and segments of chords of the circle, and a group of interpole magnets adjoining the pole magnets and having planes of symmetry and lateral surfaces, the lateral surfaces of the interpole magnets facing the periphery of the circle and the center of the circle, the interpole magnets having substantially radial planes of symmetry and being magnetized perpendicularly thereto, lateral surfaces of the interpole magnets in combination with the other poles of the pole magnets forming an outermost cylindrical surface of the rotor and each interpole magnet forming in cross-section a geometrical figure symmetrical about the plane of symmetry, said figure having opposite sides contiguous and coterminal with said segments of said chords of adjacent pole magnets.

2. A multipole rotor as claimed in claim 1, wherein said segments of chords meet at a point on the plane of symmetry of the respective pole magnet.

3. A multipole rotor as set forth in claim 2, in which the angle $\beta$ between the segments of chords of each said pole magnet is derived from the relation:

$$\beta = \alpha \left( \frac{p}{3} + \frac{3}{4} \right),$$

where p is the number of pairs of poles of the rotor and $\alpha$ is the extent of the peripheral arc of each pole magnet.

4. A multipole rotor as claimed in claim 2 in which the angle between the segments of chords of each pole magnet is equal to $$\frac{\pi}{p}.$$

5. A multipole rotor as claimed in claim 1 in which the length of the arc is essentially equal to the pole division of the rotor, the segments of chords extending from the ends of the arc and the cross-section of each pole magnet is substantially in the form of an isosceles triangle having equal sides forming said segments and an apex located at said point.

6. A multipole rotor as set forth in claim 1 wherein the rotor has an inner surface defined by adjacent lateral surfaces of the interpole magnets.

* * * * *